(12) United States Patent
Serpelloni

(10) Patent No.: US 7,186,433 B2
(45) Date of Patent: Mar. 6, 2007

(54) FIBRE-ENRICHED DRINKS

(75) Inventor: Michel Serpelloni, Beuvry-les-Bethune (FR)

(73) Assignee: Roquette Freres, Lestrum (FR)

( * ) Notice: Subject to any disclaimer, the term of this patent is extended or adjusted under 35 U.S.C. 154(b) by 9 days.

(21) Appl. No.: 10/113,253

(22) Filed: Mar. 29, 2002

(65) Prior Publication Data

US 2003/0077368 A1    Apr. 24, 2003

(30) Foreign Application Priority Data

Mar. 30, 2001   (FR) .................................. 01 04410

(51) Int. Cl.
*A23L 2/00*    (2006.01)
(52) U.S. Cl. ...................... 426/590; 426/548; 426/589; 426/599
(58) Field of Classification Search ................ 426/548, 426/521, 589, 590, 599, 804
See application file for complete search history.

(56) References Cited

U.S. PATENT DOCUMENTS 5,032,411 A * 7/1991 Stray-Gundersen .......... 426/74
5,851,578 A   12/1998 Gandhi
6,630,586 B1 * 10/2003 Fouache et al. ............ 536/103

FOREIGN PATENT DOCUMENTS

EP    0 792 589         9/1997
EP    1006128 A1 *   12/1999
WO   WO 95/02969      2/1995

OTHER PUBLICATIONS

Derwent abstract N° XP002184875 of RU 2 140 178.
U.S. Appl. No. 09/455,009, filed Dec. 1999, C. Fouache & al.

* cited by examiner

*Primary Examiner*—Leslie Wong
(74) *Attorney, Agent, or Firm*—Young & Thompson

(57) ABSTRACT

The subject of the invention is a fiber-enriched low-calorie drink, characterized in that it comprises 1.5 to 90 g, by dry weight per liter of drink, or branched maltodextrins having between 15 and 35% of 1→6 glucoside linkages, a reducing sugar content of less than 20%, a polymolecularity index of less than 5 and a number-average molecular mass Mn at most equal to 4 500 g/mol, and in that it is stable to acidic pH and/or to heat. The subject of the invention is also the use of branched maltodextrins having between 15 and 35% of 1→6 glucoside linkages, a reducing sugar content of less than 20%, a polymolecularity index of less than 5 and a number-average molecular mass Mn at most equal to 4 500 g/mol, in order to replace all or part of the sugars in a low-calorie drink.

5 Claims, 2 Drawing Sheets

FIGURE 1 : sensory evaluation of the drinks

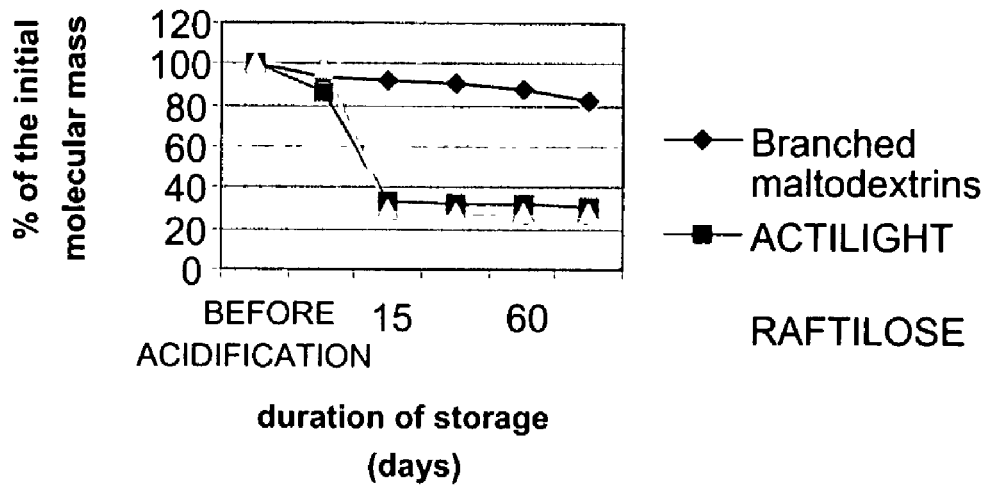
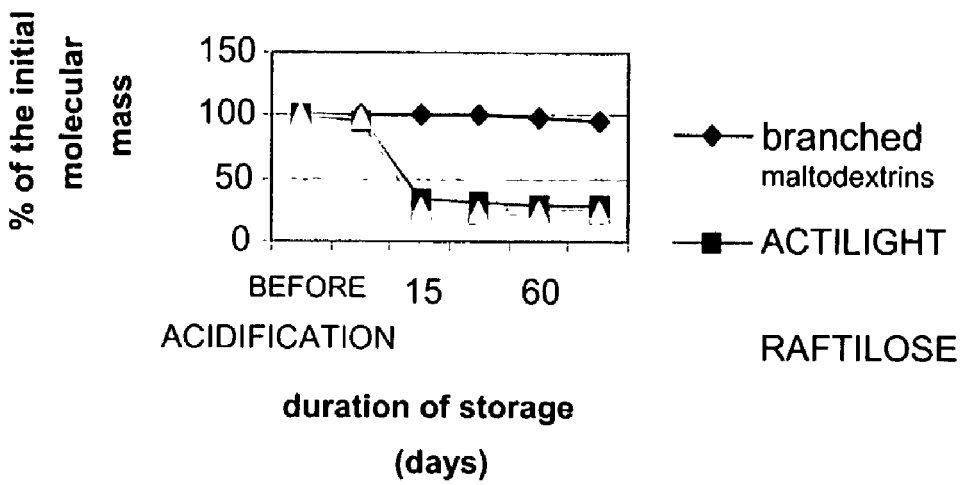
FIGURE 2

FIBRE-ENRICHED DRINKS

FIELD OF THE INVENTION

The subject of the invention is a low-calorie, fibre-enriched drink.

More precisely, the subject of the invention is a low-calorie drink which is stable over time, containing branched maltodextrins.

Its subject is also the use of branched maltodextrins for replacing all or part of the sugars in a low-calorie drink.

BACKGROUND OF THE INVENTION

Low-calorie drinks, that is to say drinks with a reduced content of sugars and free of alcohol, which will be called hereinafter "soft drinks", are a favoured sector for intense sweeteners, as sugar substitutes. Most soft drinks having a reduced content of calories contain 0 or 1 calorie per liter and are sweetened exclusively with intense sweeteners such as saccharin, aspartame, acesulfame K, cyclamate. However, this substitution is not simple. Indeed, in sugar-free drinks, the first formulas for the complete replacement of sugars with a single sweetener have developed towards solutions involving mixtures, making it possible to reduce certain drawbacks of intense sweeteners: lack of stability to pH or to temperature, pronounced aftertastes above certain concentrations, and to imitate as much as possible the taste profile of sugar which is the reference.

It has been proposed to use sweeteners and sugars in the form of a mixture. For that, the product obtained should have, according to European legislation, an energy value which is reduced by at least 30% relative to the conventional "pure sugar" reference. "Mixed" carbonated drinks exist on the market whose sweet taste is provided half by an intense sweetener and the other half by sugar or a glucose syrup, which maintains an optimum sweet taste which is stable over time, whereas the sweetener decomposes under the effect of the acidity.

The sugars act in the drinks at the level of the sweet/sour taste balance through a mutual suppression effect with the organic acids such as citric acid which is often used. It also contributes to reinforce the flavour notes, which forces formulators to completely review their flavour formulations in the case of partial or complete replacement of the sugar (s).

Finally, in conventional soft drinks, the use of 80 to 120 grams of sugars per liter makes it possible to obtain the ideal viscosity which results in a consistency in the mouth, and a significant and pleasant "body". The complete replacement of the sugars with small quantities of intense sweeteners produces, on the contrary, a drink which is very flat on the palate.

It has been proposed, in particular in the document EP 0,792,589, to use erythritol as agent for stabilizing aspartame in low-calorie drinks. The use of polyols in this application can, however, pose problems of tolerance and cause intestinal disorders.

A need therefore exists for an ingredient capable of replacing sugars while reducing the calorie supply and the cariogenicity of the drink, while ensuring its supply of fullness in the mouth, and while being stable under the usual acidic pH conditions.

The Applicant then found that this aim could be achieved provided that a particular maltodextrin was used as sugar substitute.

BRIEF DESCRIPTION OF THE DRAWINGS

FIG. 2 shows the variation in the molecular masses of oligosaccharides in solution as measured during storage by steric exclusion followed by differential refractometric detection.

DETAILED DESCRIPTION OF THE INVENTION

Figure 1:
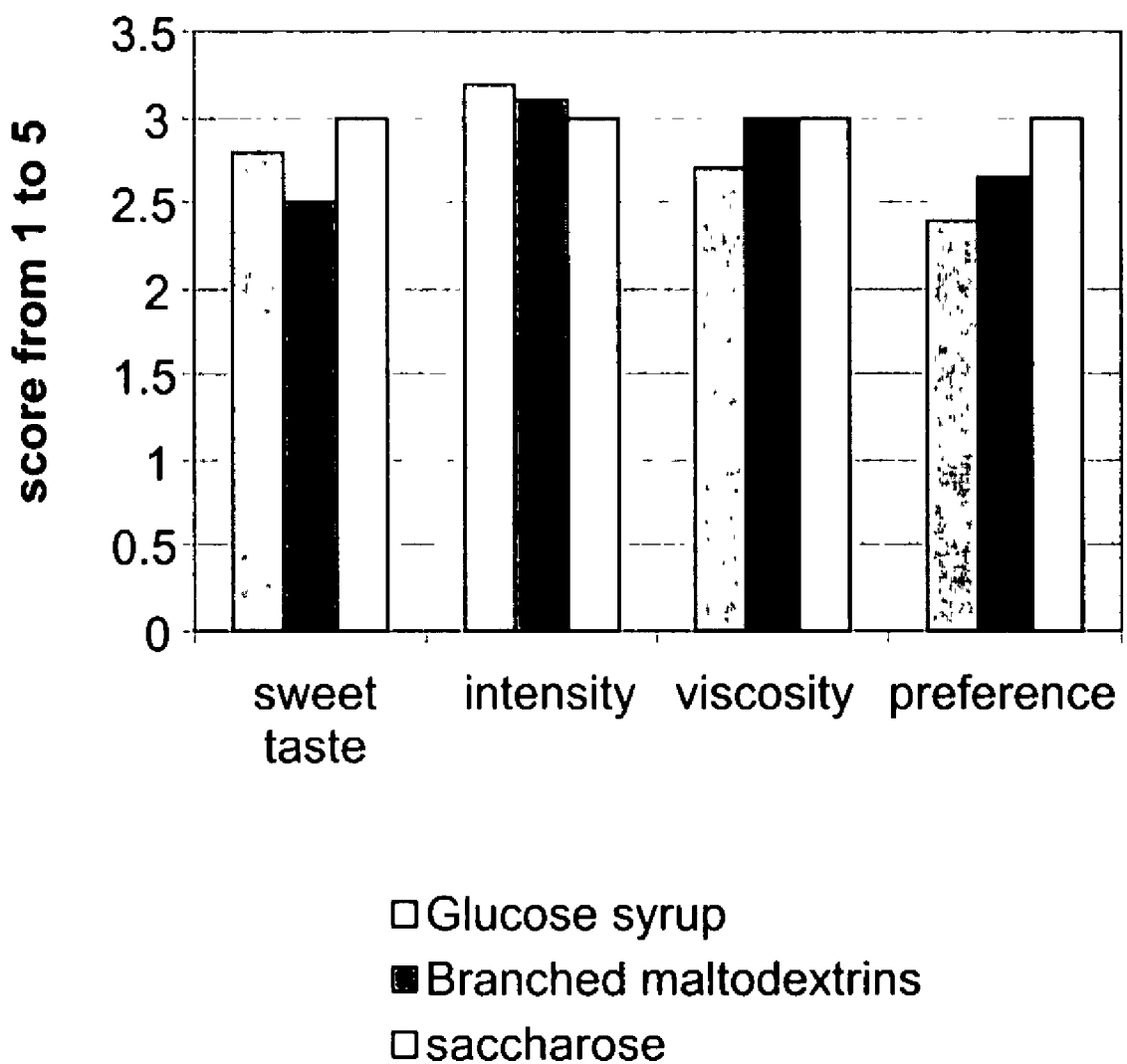
FIG. 1 shows sensory evaluation of the drinks containing glucose syrup, branched maltodextrins, and saccharose.

The subject of the invention is therefore a low-calorie drink, characterized in that it comprises 1.5 to 90 g, by dry weight per liter of drink, of branched maltodextrins having between 15 and 35% of 1→6 glucoside linkages, a reducing sugar content of less than 20%, a polymolecularity index (ratio of weight-average molecular mass over number-average molecular mass) of less than 5, and a number-average molecular mass Mn at most equal to 4 500 g/mol.

The expression branched maltodextrins is understood to mean, for the purposes of the present invention, the maltodextrins described in Patent Application EP 1,006,128 and in its US counterpart (U.S. Ser. No. 09/455,009, now U.S. Pat. 6,630,586 the entire content of which is herein incorporated by reference) of which the Assignee is proprietor. These branched maltodextrins have an indigestibility character which has the consequence of reducing their calorific value by preventing their assimilation in the small intestine. They therefore constitute a source of indigestible fibre. As a guide, their insoluble fibre level is generally greater than 50% on a dry matter basis. Their low content of molecules having a low degree of polymerization ("DP") also contributes to their reduced calorific value. Their high content of 1→6 glucoside linkages has the consequence of reducing their cariogenic power by reducing their assimilation by the microorganisms of the buccal cavity. This high level of 1→6 linkages also confers quite particular prebiotic properties on them: it has indeed appeared that the bacteria of the cæcum and of the colon of humans and animals, such as butyrogenic, lactic or propionic bacteria, metabolize highly branched compounds. Moreover, these branched maltodextrins promote the development of bifidogenic bacteria to the detriment of the undesirable bacteria. This results in properties which are quite beneficial to the health of the consumer.

Products having similar functionalities, such as in particular the fructooligosaccharides marketed under the name ACTILIGHT by BEGHIN-SAY or by ORAFTI under the name RAFTILOSE, which also have beneficial effects on health in terms of bifidogenic properties, have been proposed in fibre-enriched soft drinks. These products have, nevertheless, the disadvantage of being very unstable under acidic pH conditions. This instability results in gradual hydrolysis during storage, which causes an undesirable release of glucose and fructose. This instability is dissuasive for use in soft drinks, practically all of which have an acidic pH. These products are therefore rather used in drinks such as mineral water whose pH is generally higher.

The Applicant has found that the incorporation of the said branched maltodextrins advantageously allowed partial or complete replacement of the sugars in the drinks, while providing them with an identical viscosity in the mouth, while reducing their calorific value and their cariogenicity, and while constituting a supply of indigestible fibres in an application which the fructooligosaccharides could not achieve.

Thus, by replacing, in a drink, all the sugars generally present in an amount of 80 to 120 grams per liter of drink with a mixture of branched maltodextrins and intense sweeteners chosen so that the branched maltodextrin content provides sufficient body to the drink and the content of intense sweeteners provides the desired sweet taste, a low-calorie drink is obtained up to 60% of its initial calorific value, having satisfactory organoleptic qualities, according to a taste panel.

A fibre-enriched low-calorie drink in accordance with the invention comprises 1.5 to 90 g, preferably 5 to 90 g, and still more preferably from 10 to 90 g on a dry basis of branched maltodextrins per liter of drink, so as to obtain, in the case where intense sweeteners are used, the reduction of at least 30% of the standard calorific value of a drink containing sugars. The branched maltodextrins have an insoluble fibre level greater than 50% on a dry basis, determined according to the AOAC method No. 985-29 (1986). Below 1.5 g of branched maltodextrins per liter of drink in accordance with the invention, the supply of fibres is insufficient to be detected.

All the compositions described in Patent Application EP 1,006,128 and in its US counterpart (U.S. Ser. No. 09/455,009, now U.S. Pat. No. 6,630,586 which is herein incorporated by reference) are appropriate for the preparation of drinks according to the invention.

According to a preferred variant, they have a reducing sugar content of between 2 and 5% and a number-average molecular mass of between 2 000 and 3 000 g/mol.

According to another advantageous variant, all or some of these branched maltodextrins are hydrogenated.

The drink in accordance with the invention may comprise, in addition, an intense sweetener chosen from the group consisting of aspartame, alitame, neotame, Acesulfame K, saccharin, cyclamate, sucralose, steviosides and neohesperidin, alone or in the form of a mixture.

Preferably, the said intense sweetener is present in an amount of 0.01 to 1.0 g/l.

The said drink may also comprise organic acids such as in particular citric, phosphoric or ascorbic acid, alone or in the form of a mixture, sodium benzoate, and a flavouring.

The subject of the invention is also a fibre-enriched drink in which the said branched maltodextrins do not replace the sugar, but constitute a supply of fibres which are beneficial to health, resistant to heat treatments and stable during storage even under acidic conditions. This may include, for example, drinks such as sodas, or fruit or vegetable juices, or mineral water, flavoured or otherwise. This may also include drinks which are most often consumed hot, such as soups. Indeed, the incorporation of the said branched maltodextrins into soups is quite advantageous for the following reasons: soups are enriched with fibres and have improved organoleptic properties, in particular in terms of consistency and unctuousness, in terms of absence of unpleasant aftertaste and of a weaker sweet taste than when fructooligosaccharides, for example, are used. Furthermore, the heat stability and the stability to acidic pH of the branched maltodextrins is here again very advantageous since soups are sterilized or pasteurized products and most often have an acidic pH. Accordingly, conventional maltodextrins or soluble fibres of the prior art, which are not very stable under these conditions, cannot be used.

The drink advantageously comprises 1.5 to 90 g on a dry basis per liter of drink of branched maltodextrins having between 15 and 35% of 1→6 glucoside linkages, a reducing sugar content of less than 20% and preferably of between 2 and 5%, a polymolecularity index of less than 5 and a number-average molecular mass $M_n$ at most equal to 4 500 g/mol, and preferably of between 2 000 and 3 000 g/mol.

The invention also relates to a fibre-enriched soup, characterized in that it comprises 1 to 30%, preferably 1 to 15% by weight of the said branched maltodextrins. The soup thus obtained is advantageously stable to acidic pH and to heat. It may be provided in liquid form, concentrated or otherwise, or alternatively in dehydrated form to be reconstituted.

The subject of the invention is in addition the use of branched maltodextrins having between 15 and 35% of 1→6 glucoside linkages, a reducing sugar content of less than 20%, a polymolecularity index of less than 5 and a number-average molecular mass $M_n$ at most equal to 4 500 g/mol, in order to replace all or part of the sugars in a low-calorie drink. The expression sugars is understood to mean, for the purposes of the present invention, sucrose, glucose, glucose syrups, isoglucose as well as all the saccharides commonly used in the preparation of sweetened drinks or of soups. According to an advantageous variant, the said branched maltodextrins have a reducing sugar content of between 2 and 5% and a number-average molecular mass $M_n$ of between 2 000 and 3 000 g/mol.

Preferably, the said branched maltodextrins are incorporated into the low-calorie drink in an amount of 1.5 to 90 g on a dry basis per liter of drink. In a particularly advantageous manner, the said branched maltodextrins may be incorporated in the form of liquid mixtures with various sugars or polyols commonly used in drinks. These liquid mixtures furthermore have the advantage of being particularly stable with respect to the bacteriological quality. The invention therefore also relates to a fibre-enriched drink, with reduced sugar levels or otherwise, characterized in that all or some of the said branched maltodextrins are incorporated in the form of a liquid mixture with one or more sugars or polyols chosen from the group consisting of glucose, fructose, xylose, lactulose, erythrose, maltitol, xylitol, erythritol, isomalt.

Likewise, indigestible dextrins such as those marketed, for example, by the company MATSUTANI under the name FIBERSOL® may be combined with the said branched maltodextrins.

The invention will be understood more clearly on reading the examples which follow and the figures relating thereto.

EXAMPLE 1:

Preparation of Fizzy Soft Drinks

Fizzy soft drinks containing, on the one hand, sucrose, and, on the other hand, glucose syrup and branched maltodextrins as a complete substitute for sucrose, are prepared.

Quantities in grams per 1 liter of drink:

|  | Control (sucrose) | Trial 1 (glucose syrup) | Trial 2 (according to the invention) |
|---|---|---|---|
| Sucrose | 100 |  |  |
| Glucose syrup |  | 86.42 |  |
| Branched maltodextrins |  |  | 73.68 |
| Aspartame |  | 0.078 | 0.118 |
| Acesulfame K |  | 0.078 | 0.118 |
| Lemon flavour | 0.7 | 0.7 | 0.7 |
| Citric acid (dry) | 1.9 | 1.9 | 1.9 |
| Sodium benzoate | 0.09 | 0.09 | 0.09 |

-continued

|  | Control (sucrose) | Trial 1 (glucose syrup) | Trial 2 (according to the invention) |
|---|---|---|---|
| (dry) Carbonated water at 4° C. | qs 11 | qs 11 | qs 11 |

Sucrose: sieved manufacturer's sugar (BEGHIN-SAY)
Glucose syrup: FLOLYS ® E7081S
Aspartame: NUTRASWEET
Acesulfame K: HOECHST
Lemon flavour: AG 31711 (QUEST)

The branched maltodextrins present between 15 and 35% of 1→6 glucoside linkages, a reducing sugar content of between 2 and 5%, a polymolecularity index of less than 5, and a number-average molecular mass Mn of between 2 000 and 3 000 g/mol:

| Reducing sugars | 2.3 |
|---|---|
| Mn (g/mol) | 2 480 |
| Mw (g/mol) | 5 160 |
| 1,2 linkage (%) | 10 |
| 1,3 linkage (%) | 12 |
| 1,4 linkage (%) | 49 |
| 1,6 linkage (%) | 29 |

They have, in addition, an insoluble fibre level of 55% on a dry basis, determined according to the AOAC method (No. 985-29).

0.5 liter of aerated water is prepared. The sweeteners and/or the sugar or sugar substitute are then added. The remainder of the ingredients are then incorporated and water is added to a volume of 1 liter. The drinks obtained are stored in the refrigerator, before being submitted to a taste panel.

A panel of 8 people carries out an evaluation, on the three drinks, of the following criteria:

sweet taste
flavour intensity
viscosity in the mouth
preference

Each criterion is classified on a scale from 1 to 5 in comparison with the sucrose control.

The results are represented in FIG. 1. It is observed that no significant difference appears between the three drinks. It appears that the drinks according to the invention are however preferred to those containing the glucose syrup as sucrose substitute.

EXAMPLE 2:

Study of Stability in Solution

In order to assess the stability of the branched maltodextrins in the drinks, solutions are prepared at different pH values, containing either fructooligosaccharides (ACTILIGHT 950P or RAFTILOSE P35), or branched maltodextrins in accordance with the invention.

The variation in the molecular masses of these oligosaccharides in solution is measured during storage by steric exclusion followed by differential refractometric detection.

The results are illustrated in FIG. 2.

In the case of the branched maltodextrins, a very slight effect of the acidification of the solutions is observed. There is therefore a slight hydrolysis at the very acidic pH value (less than 3) which results in a variation of the molecular weight towards lower values. After two weeks of storage, the differences are not greater than those observed immediately after acidification. After 1 month of storage, only the values obtained for the very low pH values (less than 2.7) decreased relative to two weeks ageing. The number-average molecular weight passes from 2 800 daltons to 2 400 daltons for solutions at pH 2.

In the case of the fructooligosaccharides, after two weeks of storage at pH 2, the molecular weight is reduced to 30% of its initial value. After 1 month, the solutions at pH 2 and 2.7 contain very highly degraded ACTILIGHT.

Conclusion: the branched maltodextrins are well suited to the preparation of sodas, or of fruit or vegetable juices, having a pH which is generally less than 3.

EXAMPLE 3:

Stability After Pasteurization

Fruit juices are prepared comprising branched maltodextrins according to the invention, hydrogenated or otherwise, which are subjected to a pasteurization treatment for 17 minutes at 74° C. A control without branched maltodextrins and a control comprising fructooligosaccharides are also prepared. The contents are compared before and after treatment, as well as after storage. All the fruit juices have a pH of 3.8.

The results are given by the following table:

|  | CONTROL | 7% branched maltodextrins | | 7% hydrogenated branched maltodextrins | | 7% fructooligo-saccharides (ACTILIGHT ®) | |
|---|---|---|---|---|---|---|---|
|  |  |  | Branched malto- | Hydro-genated branched malto- |  |  |  |
|  | Sucrose | Sucrose | dextrins | Sucrose | dextrins | Sucrose | FOS |
| Before pasteurization | 2.5 | 2.4 | 7.0 | 2.1 | 6.8 | 2.3 | 6.7 |
| After pasteurization | 1.4 | 1.6 | 7.0 | 1.6 | 6.8 | 2.4 | 4.5 |

|  | CONTROL | 7% branched maltodextrins | | 7% hydrogenated branched maltodextrins | | 7% fructooligo- saccharides (ACTILIGHT ®) | |
|---|---|---|---|---|---|---|---|
|  | Sucrose | Sucrose | Branched malto- dextrins | Sucrose | Hydro- genated branched malto- dextrins | Sucrose | FOS |
| After pasteurization + 1.5 months | nd | nd | 6.9 | nd | 6.9 | 3.8 | 2.4 |
| After pasteurization + 3 months | 1.5 | 1.5 | 7.1 | 1.2 | 7.1 | 3.4 | 1.7 |

These results demonstrate the absence of degradation of the branched maltodextrins according to the invention, hydrogenated or otherwise, because they are hydrolysed neither during the heat treatment, nor during the storage for three months. The fructooligosaccharides become highly degraded with pasteurization (−30%) and with storage (−60% after three months relative to the value after pasteurization). This is observed both through the reduction in the level of FOS and through the increase in the content of sucrose (product of hydrolysis). This confirms the most particular advantage of the maltodextrins according to the invention in fibre-enriched drinks intended in particular to be sterilized or pasteurized.

EXAMPLE 4:

Preparation of Soups

A concentrated tomato soup (to be consumed, it has to be diluted 50%) is prepared according to the following protocol. The soup according to the invention is enriched with branched maltodextrins described in example 1. For comparison, soups are prepared based on the same recipe, but comprising either a standard maltodextrin (GLUCIDEX® 6) or fructooligosaccharides (RAFTILOSE® P95). The pH of the soups is 4.2.

Recipe (composition in grams):

Protocol:

Mix the oil, the water at 90° C, the emulsifier CLEARGUM® C001, and the whey in the bowl of a KENWOOD mixer for 10 minutes at the maximum speed.

Mix separately the sucrose, the modified starch CLEARAM® CH20, the tomato puree, the citric acid and the water. Cook on a waterbath to 80° C.

Mix the tomato sauce thus obtained with the preceding emulsion for 30 seconds.

Place the soup in tins, sterilize at 110° C. for 50 minutes.

Before consumption, the soup is diluted 50% by weight in water and heated to 70° C.

The various soups obtained are submitted to tasting by a panel of 11 untrained tasters, who evaluate the following criteria:
- colour
- consistency as assessed with a spoon
- unctuousness in the mouth
- sweet taste
- preference The following results are obtained:

Colour: the lightest soup is the control soup, the darkest soups are those containing the standard maltodextrin (Maillard reaction).

Consistency as assessed with a spoon: no significant difference was noted other than the imparting of consistency

|  | CONTROL | Invention 1 | Invention 2 | Comparative 1 | Comparative 2 | Comparative 3 | Comparative 4 |
|---|---|---|---|---|---|---|---|
| CLEARGUM ® CO01 | 0.3 | 0.3 | 0.3 | 0.3 | 0.3 | 0.3 | 0.3 |
| Whey | 0.37 | 0.37 | 0.37 | 0.37 | 0.37 | 0.37 | 0.37 |
| Soya bean oil | 3 | 3 | 3 | 3 | 3 | 3 | 3 |
| Water at 90° C. | 9.8 | 9.8 | 9.8 | 9.8 | 9.8 | 9.8 | 9.8 |
| Sucrose | 5.0 | 5.0 | 5.0 | 5.0 | 5.0 | 5.0 | 5.0 |
| CLEARAM ® CH20 | 2.4 | 2.4 | 2.4 | 2.4 | 2.4 | 2.4 | 2.4 |
| Tomato puree 28% | 36.0 | 36.0 | 36.0 | 36.0 | 36.0 | 36.0 | 36.0 |
| Citric acid | 0.1 | 0.1 | 0.1 | 0.1 | 0.1 | 0.1 | 0.1 |
| Water | 43 | 35.6 | 28.17 | 36.51 | 29.99 | 35.6 | 28.17 |
| Branched maltodextrins | 0 | 7.43 | 14.86 | 0 | 0 | 0 | 0 |
| RAFTILOSE ® P95 (ORAFTI) | 0 | 0 | 0 | 6.52 | 13.04 | 0 | 0 |
| GLUCIDEX ® 6 | 0 | 0 | 0 | 0 | 0 | 7.43 | 14.86 |
| Total (g) | 100 | 100 | 100 | 100 | 100 | 100 | 100 | due to the increase in dry matter. The soups containing standard maltodextrins and FOSs have, however, a higher viscosity after sterilization.

Unctuousness in the mouth: after sterilization, only the soups according to the invention are perceived as more unctuous than the control.

Sweet taste: the soups comprising fructooligosaccharides were perceived as being too sweet.

Aftertaste: the soups containing standard maltodextrins and fructooligosaccharides have a marked aftertaste: aftertaste of starch and smell of honey for the standard maltodextrins, aftertaste of cereals for the soups with the fructooligosaccharides. The soups according to the invention have no aftertaste, like the control.

Preference: the soups according to the invention are distinctly preferred by the tasters because they are thicker and more unctuous in the mouth than the control soup, with no unpleasant aftertaste which the standard maltodextrins and the FOSs have, with a sweet taste which is very similar to the control. The branched maltodextrins are therefore quite advantageous in the preparation of fibre-enriched soups in accordance with the invention. They retain a behaviour similar to the control even after sterilization at high temperature.

The invention claimed is:

1. A process for producing a fiber-enriched drink, comprising adding to an acidic drink 10 to 90 g on a dry basis per liter of drink of branched maltodextrins as indigestible fiber supplying product, said maltodextrins having between 15 and 35% of 1–6 glucoside linkages, a reducing sugar content of between 2 and 5%, a polymolecularity index of less than 5 and a number-average molecular mass Mn of between 2000 and 3000 g/mol, and an insoluble fiber level greater than 50% on a dry matter basis, whereby the viscosity in the mouth is preserved and whereby the fiber-supplying product content incorporated remains essentially constant during storage and manufacturing, and whereby a reduction of at least 30% of the standard calorific value of a drink containing sugars is obtained, wherein said maltodextrins are added in an amount such that said fiber-enriched drink is stable for at least three months after preparation of said drink.

2. The process of claim 1, wherein all or some of said branched maltodextrins are incorporated in the form of a liquid mixture with one or more compounds selected from the group consisting of fructose, maltitol, erythritol, xylitol and isomalt.

3. The process of claim 1, further comprising sterilizing said drink by application of heat after said maltodextrins have been added thereto.

4. The process of claim 3, wherein said drink is soup.

5. The process of claim 3, wherein said drink is fruit juice.

* * * * *